United States Patent [19]

Maitre

[11] Patent Number: 5,095,963

[45] Date of Patent: Mar. 17, 1992

[54] TIRE TREADS

[75] Inventor: Bruno P. Maitre, Hesperange, Luxembourg

[73] Assignee: The Goodyear Tire & Rubber Company, Akron, Ohio

[21] Appl. No.: 483,179

[22] Filed: Feb. 22, 1990

[51] Int. Cl.⁵ .............................................. B60C 11/12
[52] U.S. Cl. ............................ 152/209 R; 152/DIG. 3
[58] Field of Search ......... 152/209 B, 209 D, DIG. 3

[56] References Cited

U.S. PATENT DOCUMENTS

| | | | |
|---|---|---|---|
| 2,246,479 | 6/1941 | Schrank | 152/DIG. 3 |
| 2,538,491 | 1/1951 | Winston | 156/209 R |
| 4,934,424 | 6/1990 | Kojima | 152/DIG. 3 X |
| 4,994,126 | 2/1991 | Lagnier | 152/209 R |

FOREIGN PATENT DOCUMENTS 1274554 5/1972 United Kingdom.

Primary Examiner—John J. Gallagher
Assistant Examiner—Nancy T. Krawczyk
Attorney, Agent, or Firm—David L. King

[57] ABSTRACT

A tire tread with elastomeric ground engaging elements having an incision is described. The invention is characterized by at least one of the elements having an incision extending from the tread surface towards the interior of the elastomeric material. The incision splits into at least two incision portions in the interior of the elastomeric material below the tread surface. The incision portions extend away from the tread surface and diverge apart from each other over at least part of their depth.

7 Claims, 2 Drawing Sheets

TIRE TREADS

The present invention relates to that portion of tires that comes into contact with the road when the tires are normally inflated and under normal load i.e. to tire treads. That is to say, the invention applies both to new and to retreaded tires.

The tread portion of a pneumatic tire generally has a plurality of grooves therein defining ground engaging elastomeric elements such as blocks and ribs. These ground engaging elements are usually provided with narrow incisions, such as sipes or cuts. A sipe is a groove having a width in the range from about 0.2% to 0.8% of the tread width, i.e. the arc length of the tread surface in the axial direction, that is, in a plane containing the axis of rotation of the tire. The sipe closes when it is located in the tire footprint, i.e. in the contact patch of the tire tread with a flat surface at zero speed and under normal load and pressure. Such a sipe typically is formed by steel blades inserted into a cast or machined mold or tread ring therefor. A cut is usually made by a cutting tool and has a negligible width.

The incisions may extend circumferentially or laterally about the tread in a straight, curved or zig-zag manner and may be as deep as the grooves or have a depth which is even greater than the groove depth. The incisions can pass through the sides of the ribs and blocks or be confined to their interior. It is known to have the incisions lying in planes which are not perpendicular to tangents to the surface of the tread at their point of intersection; the inclination of the planes defining neighboring incisions can be identical or differ stepwise along the block length. It is further known to use incisions having a depth which varies across their length, e.g. so-called hump-blades.

Incisions improve the flexibility of the blocks without destroying their solidity. The easy relative longitudinal sliding between the opposed faces of an incision weakens the resistance of the blocks to flexing in the contact area between tread and road and therefore slows down the heat built-up of the tire. The incisions increase also the friction coefficient of the elastomeric blocks and they multiply the number of the ground engaging edges in the tire footprint, hence improving markedly the grip of the tire.

As the tire wears down, the tread depth thereof changes. The tread grooves generally become narrower and the incisions, being just a few mm deep, disappear when the tread rubber wears off. The reduced depth of the grooves and of the incisions hampers the wiping and digging action of the tread surface hence reducing the traction and braking characteristics of the tire.

Wear continuously increases the stiffness of the blocks and ribs, which has been chosen to optimize the cornering characteristics of the new tire.

The aim of the invention is to avoid these drawbacks and to create a tire tread having a more constant handling response regardless of the state of wear of the tread pattern.

This aim is achieved by the tire tread as described in the appended claims.

The advantages are an overall lower noise and a higher comfort through a uniform block stiffness during the tire life. The wear resistance of the tread is improved through a diminished slipping of the blocks on the road. As the tread blocks follow better the irregularities of the road, the grip of the tire is improved, especially towards the end of its lifetime. Furthermore, the self aligning torque is diminished, even when the tire has a worn tread.

SUMMARY OF THE INVENTION

The invention relates to a tire tread comprising elastomeric material, a plurality of grooves therein, defining ground engaging elastomeric elements. The elements are provided with incisions. The invention is characterized in that at least one of said elements has an incision, the incision having at least three portions the first of which extends from the tread surface towards the interior of said elastomeric material. The incision splits into at least second and third incision portions at a location or locations below the tread surface. The second and third incision portions extend away from the tread surface and diverge apart from each other over at least part of their depth.

The above invention can be configured into a variety of novel designs. One design includes having at least two of the incision portions diverge continuously over their whole depth. The first incision splits into second and third incision portions below the tread surface. A second design has at least two of the incision portions extending to the same depth. A third design has at least two of the incision portions having the same length. A fourth embodiment is characterized in that the first incision has a greater length than at least one of the incision portion. A fifth embodiment is characterized by the first incision portion having a greater width than at least one of the incision portions.

A sixth embodiment has an incision where at least a portion of the incision has substantially no width.

The incision can be in a plane forming an angle between 0° and 30° with a plane perpendicular to the ground engaging surface of the tread.

At least one of the incision portions can have substantially no width.

The tire tread can be configured with the incision plus any of the incision portions having a combined depth which is substantially equal to the groove depth.

The tire tread in another embodiment of the invention is characterized by having at least one of said incision portions split up into two further incision portions diverging apart from each other and extending away from the tread surface.

To acquaint persons skilled in the art, most closely related to the instant invention, certain preferred embodiments are now described with reference to the annexed drawings. These embodiments are illustrative and can be modified in numerous ways within the spirit and scope of the invention defined in the claims.

Figure 1:
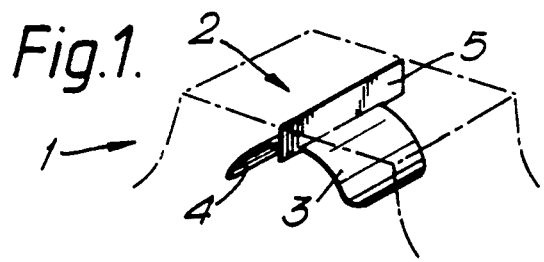
FIG. 1 is a perspective view of a tread block according to the invention during the vulcanization step.

With reference to FIG. 1, there is represented a single elastomeric block 1 of a tread pattern during the vulcanization step having a blade 2 according to the invention embedded therein. The neighboring blocks and ribs of the tread pattern have not been represented for simplification and clarity; the same applies to the mold, which can be either of the segmented or of the twopiece type. The radially outermost portion 5 of the blade 2, has a rectangular shape and is partly inserted in and glued to the mold (not represented). This rectangular portion lies in a plane which can form an angle between 0° and 30° with a radial direction passing through it. Radial is used to mean directions radially toward or away from the axis of rotation of the tire. The radially innermost two lateral portions 3, 4 of the blade 2 diverge from the plane including the rectangular portion 5 and outline in this embodiment part of a cylinder. To ascertain a perfect filling of the block shape with elastomeric material, it is preferred that the two portions 3, 4 of the blade include several flow openings (not represented), allowing a free flow of the elastomeric material to the radially outermost parts of the block at the beginning of the shaping and throughout the vulcanizing step. Such flow openings can have a circular section and a diameter of a few millimeters.

When the tire is cured and the mold is opened, the indentations and blades are retracted from and out of the tread pattern. The radially innermost portions 3 and 4 of each blade cut the elastomeric material situated in the flow openings and leave the tire tread through the sipe molded into the block 1 by the radially outermost portion 5 of the blade; in so doing, the blade portions 3 and 4 move towards each other, and the block deforms and opens slightly radially outwardly on both sides of the sipe. It is to be considered that the representation in FIG. 1 is not to scale and that the spacing and the dimensions of the blade portions have been exaggerated for explanatory purposes: the overall height of a blade 2—measured in a radial direction—is generally comprised between 3 and 10 mm and the maximum spacing between the two radially innermost portions 3, 4 is about 8 mm, so that the blade can leave the elastomeric compound without damaging the block. A preferred elastomeric compound has a Shore A hardness in the vulcanized state of 63 and a modulus of 7 MPa.

Figure 4:
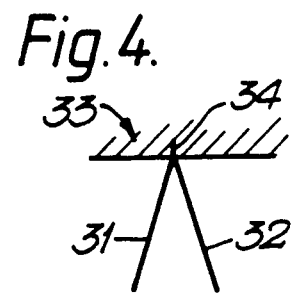
FIGS. 4, 6, 8, 10 and 12 are cross-sections of the blades shown respectively in FIGS. 3, 5, 7 and 9.

As can be seen in FIGS. 5 through 12 the incision splits into incision portions at a location below the tread surface. As illustrated in FIG. 4 the first incision portion splits into second and third incision portions below the tread surface.

Figure 2:
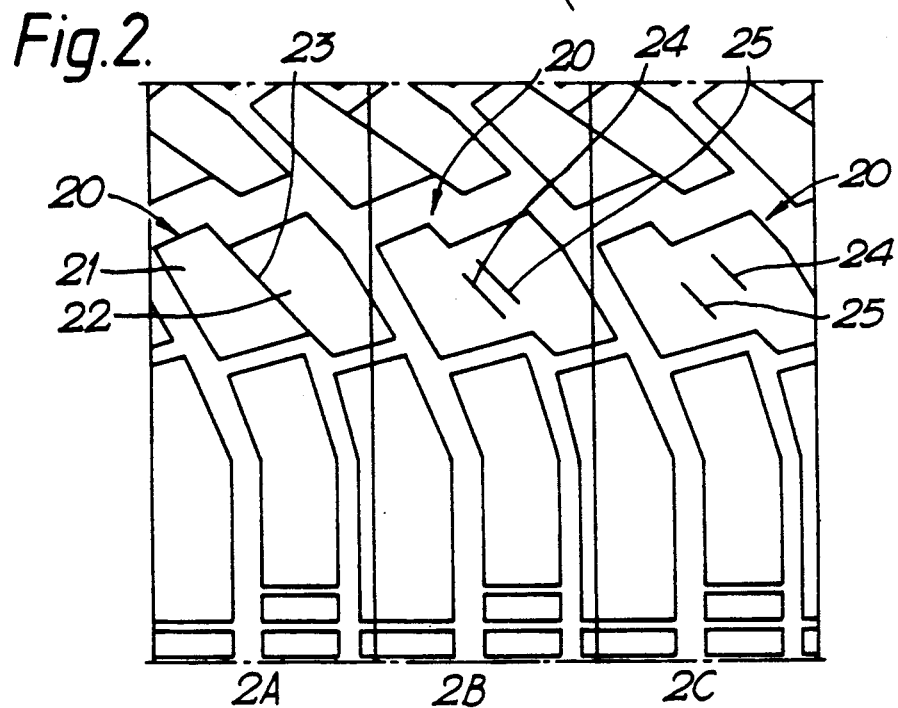
FIGS. 2A, 2B and 2C are fragmentary views of the same tread pattern portion being worn to different degrees.

Referring now to FIGS. 2A, 2B and 2C, there is shown the same pitch length of a tire tread made in accordance with the invention, in different states of wear. By pitch length is meant the design cycle length of the repetitive tread pattern elements around the tire. As represented in FIG. 2A, the tread element 20, almost new, is divided into two parts 21 and 22 by the sipe 23 made by the radially outermost portion 5 of the blade 2. The same tread portion shown in FIG. 2B, is worn to about 30% of its original radial height and the tread element 20 has two sipes 24 and 25 therein, made by the radially innermost two portions 3, 4 of the blade 2. The two sipes compensate partly for the loss of grip of the tire due to the diminished height of the surrounding tread element. The same tread portion shown in FIG. 2C is worn to about 70% of its original radial height. The increase of the distance between the sipes (references 24 and 25) reduces mainly the stiffness of the tread element 20.

Figure 3:
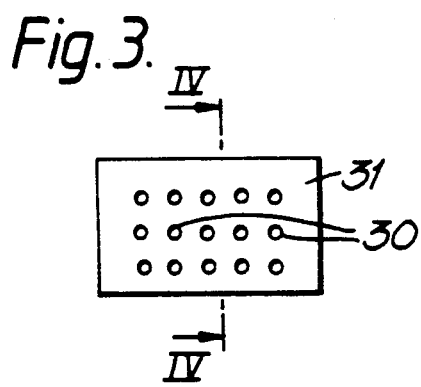
FIG. 3, 5, 7, 9 and 11 are side views of blades which can be used to implement the invention.

Referring to FIG. 3, representing a plan view and FIG. 4 a perpendicular section thereto along the plane IV—IV, there is shown a blade having its upper portion 34 fixed in the mold 33. As the blade enters the inner side of the mold it diverges into two lateral blade portions 31 and 32. Such a disposition of the blade achieves a sipe in the tire which has its openings into the tread surface separated by a distance which is proportional to the degree of wear of the tire. The portions 31 and 32 have a rectangular shape and are provided with a multitude of circular flow openings 30 allowing a free flow of the elastomeric material during the vulcanizing process. The diameter of a flow opening should be superior to 0.5 mm and preferably have between 1 and 1.5 mm.

Figure 5:
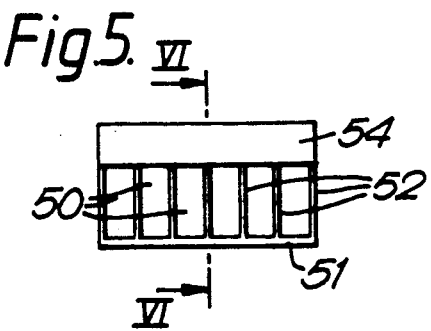
Figure 6:
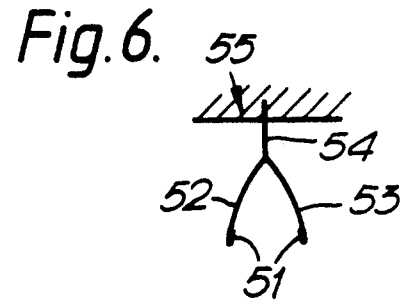

In FIG. 5 and FIG. 6, which represent respectively a side view and a section along the plane VI—VI, through the blade of FIG. 5, there is shown a further embodiment of the invention, wherein the flow openings 50 in the blade have been chosen as large as possible. Elongated strips 52 and 53 connect a plate 54 of rectangular shape to two cutting edges 51, which are as far as possible perpendicular to the surface of the unvulcanized tire when they enter the tire during the closing of the mold 55. When the mold is opened after the vulcanizing step, the elongated strips 52 and 53 draw the cutting edges 51, having a sharpened upper side, through the elastomeric material, thereby leaving cuts in the tire tread.

Figure 7:
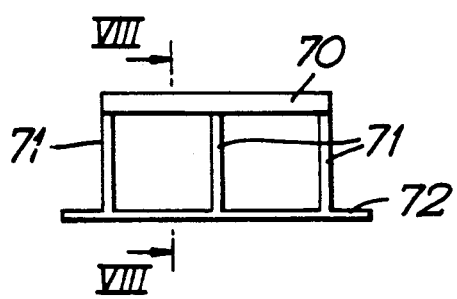
Figure 8:
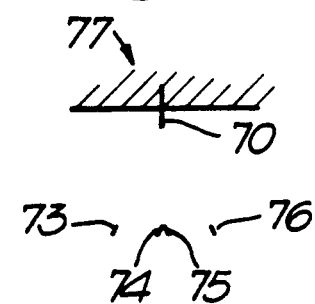

In FIG. 7 and FIG. 8, which represents a section along the plane VIII—VIII, through the embodiment of the invention shown in FIG. 7, a blade is represented having a radially outermost plate 70 fixed in the mold 77. Several elongated strips 71 connect two cutting edges 72, having both their radially innermost and outermost sides sharpened, to the plate 70. When the mold is open, the cutting edges are located one against the other as indicated by references 74 and 75. By closing the mold, the cutting edges cut into the unvulcanized tire and separate continuously in function of the inclination of the cutting edges to a radial direction intersecting them. Finally they take a spaced position as indicated by the references 73 and 76. When the mold is opened after the vulcanizing step, the elongated strips 71 pull the cutting edges 72 out of the elastomeric material, thereby cutting incisions in the tire tread. As shown in FIG. 7, the cutting edges 72 may have a greater length than the plate 70. In a preferred embodiment, the strips 71 have a length of about 6 mm and are made of spring steel.

For determining the inclination of the cutting edges, it must be considered, how the different pattern elements in the mold are closing in onto the unvulcanized tire. The lateral parts of the segments of a segmented mold, move for instance obliquely towards the unvulcanized tire.

The cuts made by the cutting edges 73 and 76 have a smaller width than the sipes molded in the elastomeric material by the plate 70, the elongated strips 71 and the cutting edges themselves. This width difference affects the heat built up in the tread; it has however no major influence on the traction properties because it is the high local pressure at the edge of the incision which improves the wiping and digging action of the tread.

Up to now the invention has been disclosed with a blade having an outer portion splitting up into two inner portions. In alternate embodiments shown on FIGS. 9 to 12, the outer portion splits up into three inner portions having possibly different lengths and depths.

Figure 9:
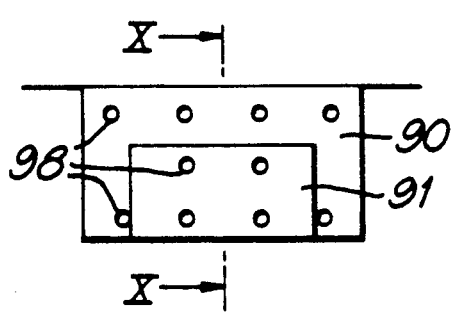
Figure 10:
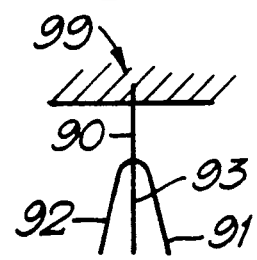

FIGS. 9 and 10 represent respectively a side view of a blade and its section along the plane X—X. The blade has a radially outermost portion 90 splitting up into one central portion 93 and two lateral portions 91 and 92. The central portion 93 is substantially situated in the continuation of the radially outermost portion 90. Both lateral portions separate from the central portion 93 and extend towards substantially the same total depth as the central portion. Both lateral portions as well as the central portion are provided with a multitude of flow openings 98 allowing a free flow of elastomeric material. A tread element worn to about 40% of its original radial height will present three sipes to the ground.

In order to facilitate the retraction of the blades out of the tread pattern, the lateral blade portions 91 and 92 have a smaller length than the central portion 93; furthermore, the radially outermost blade portion 90 has, in a preferred embodiment, a greater width than the other blade portions. This width can range between about 1% and 3% of the tread width.

Figure 11:
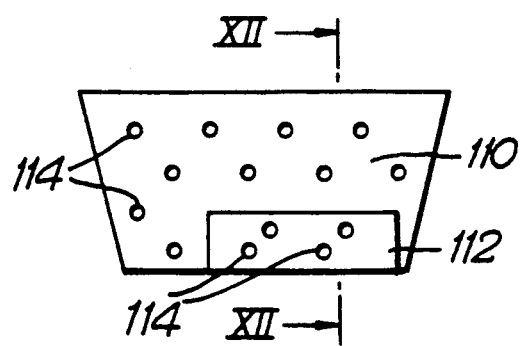
Figure 12:
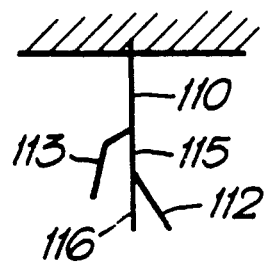

In a further embodiment of the invention shown as a side view in FIG. 11 and as a section along the plane XII—XII in FIG. 12, the radially outermost portion 110 splits up into one central portion 115 and one lateral portion 113 at about 35% of the blade height. The central portion 115 on its turn splits up into a further central portion 116 and one lateral portion 112 at about 70% of the blade height. Such a blade design allows even more precise fine tuning of the tread grip as a function of its state of wear. The central blade portions 110, 115, 116 take here a trapezoidal shape in order to facilitate retraction of the blade out of the vulcanized tire tread. The blade portions are provided with a multitude of flow openings 114.

While certain representative embodiments and details have been shown for the purpose of illustrating the invention, it will be apparent to those skilled in the art that various changes and modifications may be made therein without departing from the spirit or scope of the invention.

I claim:

1. A tire tread comprising elastomeric material, the tread having a plurality of grooves defining ground engaging elastomeric elements, at least one of the elements including a sipe, the sipe extending from the ground engaging surface generally inwardly below the surface of the ground engaging elements, the sipe having at least a first, a second, a third, a fourth and a fifth portion, the first portion extending from the tread surface and having a width, the sipe diverging below the tread surface into the second and the fourth portions, the second and fourth portions being a continuation of the first portion and being formed as a cut, and having substantially no width, the third portion being an extension of the second portion and molded having a width, the fifth portion being an extension of the fourth portion and having a width.

2. The tire tread of claim 1 further comprises the sipe having a central portion, the central portion being an extension of the first portion and located between the second and fourth portions.

3. The tire tread of claim 1 wherein the width of the third portion is narrower than the width of the first portion.

4. The tire tread of claim 3, wherein the width of the third portion is in the range of 0.2% to 0.8% of the tread width.

5. The tire tread of claim 4, wherein the width of the first portion is in the range of 1% to 3% of the tread width.

6. The tire tread of claim 5 wherein the widths of the third and fifth portions are in the range of 0.2% to 0.8% of the tread width.

7. The tire tread of claim 5 wherein the second end fourth portions are formed by cutting the tread while the first, third and fifth portions are molded into the tread.

* * * * *